W. J. BOYER.
STEERING MECHANISM.
APPLICATION FILED AUG. 14, 1919.
1,367,584. Patented Feb. 8, 1921.
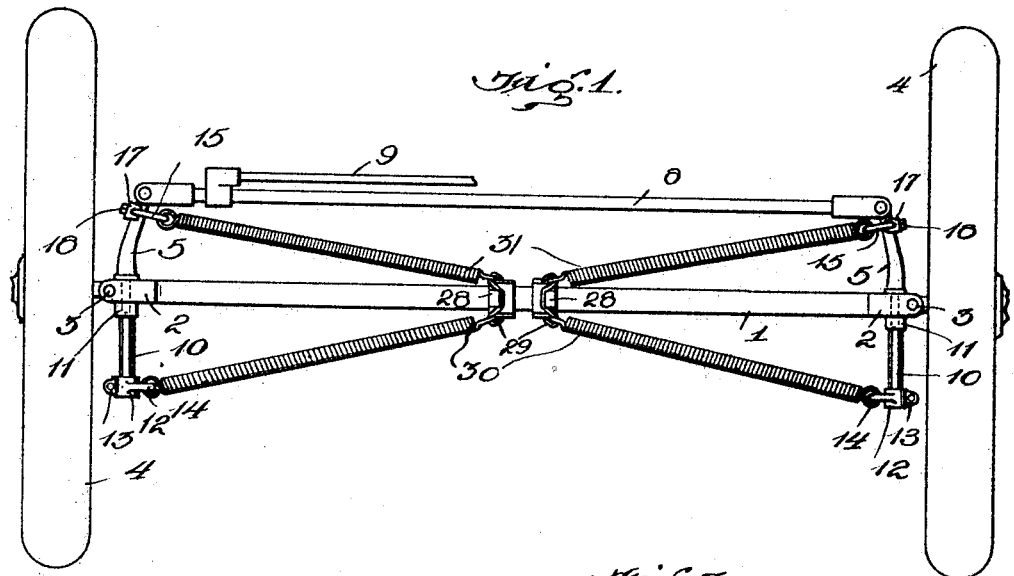
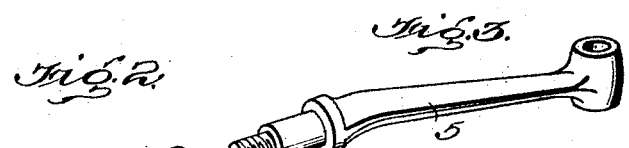
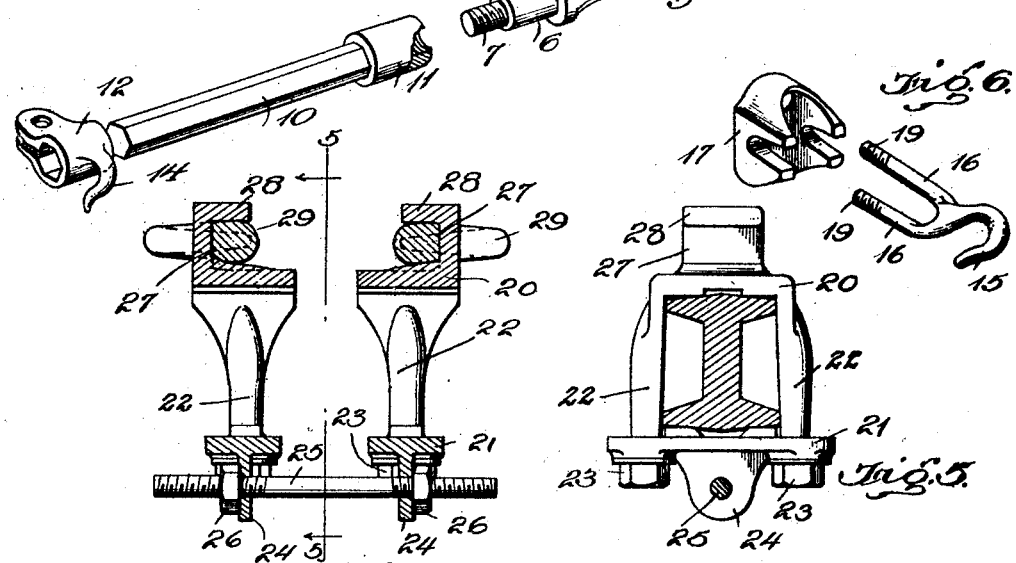
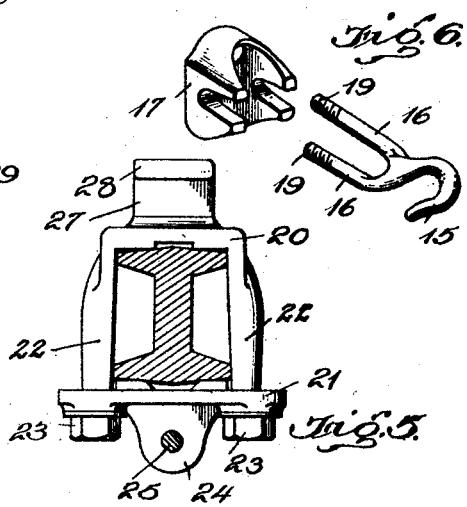
Inventor
W. J. Boyer
By Browne & Phelps
Attorneys

UNITED STATES PATENT OFFICE.

WILLIAM J. BOYER, OF WILMINGTON, DELAWARE.

STEERING MECHANISM.

1,367,584. Specification of Letters Patent. Patented Feb. 8, 1921.

Application filed August 14, 1919. Serial No. 317,438.

*To all whom it may concern:*

Be it known that I, WILLIAM J. BOYER, a citizen of the United States, residing at Wilmington, in the county of New Castle and State of Delaware, have invented certain new and useful Improvements in Steering Mechanism, of which the following is a specification.

This invention relates generally to steering mechanism for self-propelled vehicles, and more particularly to an equalizing device applicable to such mechanism whereby when there is no manipulation of the steering wheel or lever actuated by the vehicle operator the front or steered wheels of the vehicle will run true with regard to the rear or driving wheels, thus causing the vehicle to travel in a straight-ahead direction.

One of the objects of the invention is to provide a device of this character which is simple in construction and sure of operation, and which will compensate for the breakage of any part of the steering-gear, such for example as the tie-rod, the drag-link or the steering arm, by causing the vehicle to travel in a straight-ahead direction.

Another object is to provide such a device which is applicable to most of the standard makes of motor vehicles, both pleasure-cars and trucks, without alteration of their equipment.

Still another object is to provide a device of this character of such construction that, should one or more of its parts become detached or broken or for other cause inoperative, the device as a whole will not become inoperative but will continue to function as required.

A still further object is to provide a device of this character which will greatly facilitate steering under all conditions and which will prevent shocks received by the steered wheels from being transmitted to the operating wheel or lever of the steering mechanism.

To this end, the invention consists in a number of equalizing springs attached fore and aft of the front axle of the vehicle and connected therewith and with the steering knuckles of the wheels whereby a constant equalizing force will be exerted upon the wheels; and it consists further in various details of construction and arrangement of parts as will be hereinafter explained and finally claimed.

In the accompanying drawings illustrating the invention, in the several figures of which like parts are similarly designated, Figure 1 is a top plan view of the front axle and wheels of a vehicle, showing the device of the invention applied thereto. Fig. 2 is a detail perspective view, greatly enlarged, of one of the auxiliary steering arms, and its spring-attaching means, and Fig. 3 is a similar view of one of the steering arms. Fig. 4 is a longitudinal sectional view showing the devices for attaching the springs to the axle. Fig. 5 is a section taken in the plane of line 5—5 of Fig. 4. Fig. 6 is a perspective view of the parts used for attaching the springs to the steering arms, and Fig. 7 is a perspective view of one of the hook members used in connection with the devices for attaching the springs to the axle.

Referring to the drawings more in detail, the front axle 1 is provided with the usual yokes 2 in which are pivoted on king-bolts 3 the usual steering knuckles (not shown) having spindles on which are mounted the steered wheels 4.

In the particular arrangement here shown, I have illustrated the device as adapted to a Ford automobile the steering knuckles of which are provided with steering arms 5 having extensions 6 seated in the steering knuckles and firmly united therewith by means of screw-threaded spindles 7 to which nuts (not shown) are applied. The outer ends of these steering arms are connected by the usual tie-rod 8 to which the drag-link 9 is attached. In applying my device to this type of automobile, I remove these nuts and substitute therefor auxiliary steering arms 10 having screw threaded sockets 11 in their ends. The shanks of these arms 10 may be, and are here shown as of hexagonal cross-section to accommodate a monkey-wrench for facilitating their application, but it is obvious that such conformation is purely optional.

In this manner I provide fore and aft of the axle extensions from the steering knuckles substantially normal to the longitudinal center-line of the axle.

To the arms 10 I apply split collars 12 provided with suitable clamping bolts 13 whereby they may be positioned on the arms 10 at a suitable distance from the steering knuckles, and these collars 12 have projecting therefrom hooks 14 to which the equalizing springs may be attached, as will presently appear.

The steering arms are also provided with spring attaching hooks 15 having U-shaped extensions 16 adapted to embrace the arms and coöperating with seat-blocks 17 also adapted to embrace the arms and forming seats for suitable nuts 18 applied to the screw threaded ends 19 of the U-shaped extensions 16.

Substantially centrally of the axle 1 is applied a pair of brackets 20 adapted to straddle the axle and clamped thereto by means of bottom plates 21, the downwardly extending threaded portions 22 of the brackets 20 being provided with nuts 23 bearing against these plates. The plates 21 have depending perforated lugs 24 connected longitudinally of the axle by a double-ended bolt 25 and nuts 26 whereby, when the nuts 23 are loosened the brackets may be adjusted with respect to each other and to the hooks 14 and 15, longitudinally of the axle. The brackets 20 are also provided with seats 27 having overhanging lips 28 in which are loosely seated hook members 29 (see Figs. 4, 5 and 7).

The equalizing springs are attached to the hooks 14 and 15 and the hook members 29, two of the springs 30 being in front of the axle and the other two 31 behind the axle. The springs 31 located in the rear of the axle are of slightly less length than the springs 30 to compensate for the bend in the arms 5. The hook members 29 and the brackets 20 and their associated parts are interchangeable, thus facilitating the ready application of the device in place.

It is obvious that the greater the tension of the springs 30 and 31, the firmer will be the seating effect of the hook-members 29.

The method of assembling the device would seem to be obvious from the above description, but it should be said that when applying the equalizing springs the tension of all should be the same and for this purpose the collars 12 and brackets 20 may be adjusted, but the hooks 15 should be retained in initial adjustment as near the outer ends of the steering-arms as possible, substantially as shown in Fig. 1, although they too are capable of adjustment longitudinally of the arms 5.

It will therefore be seen that the springs exerting equal tension on the steering knuckles both fore and aft thereof, the wheels must necessarily travel in a straight ahead direction, and when the steering wheel or lever is operated to turn the wheels the reverse pull of one set of springs, i. e. one fore and one aft, will counteract the excess tensioning of the other set, thereby permitting steering as easy as if not easier than if the device were not present.

Should one member of either of the pairs of springs, or its connecting parts break, the companion member of said broken one would instantly fall off and become inoperative, and the other pair of springs would then continue to center the steering apparatus as though no such breakage had occurred. Thus it will be seen that my device acts instantly and automatically to overcome the effect of a breakage of any of its parts.

It is of course understood that I do not intend to limit my invention to the specific embodiment shown, as it is obvious that various changes in details of construction and arrangement of parts will be necessary to adapt the device to various makes of automobiles, such changes being permissible within the spirit of the invention and the scope of the following claims.

What I claim is:

1. In a steering mechanism, the combination with an axle and steering knuckles mounted at the ends thereof, of arms extending fore and aft of said knuckles and attached thereto, spring attaching means on said arms adjustable longitudinally thereof, brackets mounted on and frictionally engaging said axle and adjustable longitudinally thereof, hook members detachably engaging said brackets, and two sets of tension springs one fore and one aft of said axle and attached to said hook members and to said spring-attaching means.

2. In a steering mechanism, the combination with an axle having steering knuckles mounted at its ends, of arms extending from said knuckles, spring-attaching means adjustable on said arms, brackets on said axle, seats in said brackets, hook members releasably mounted in said seats, and springs extended under tension between said hook members and spring-attaching means.

3. In a spring-controlled steering mechanism, an axle provided with steering knuckles at its ends, springs connected with said knuckles and with the axle fore and aft thereof, means whereby the springs are attached to the axle, said means including members so mounted as to become disengaged from the axle upon the breakage of a spring attached thereto, thereby releasing the unbroken spring so attached.

In testimony whereof I affix my signature in presence of two witnesses.

WILLIAM J. BOYER.

Witnesses:
JACOB ENDERS,
BLANCHE T. DEAKYNE.